United States Patent Office 3,183,218
Patented May 11, 1965

3,183,218
ALUMINUM AND MERCURIC CHLORIDE CATALYST COMPOSITION AND PROCESS
Frank X. Werber, Rockville, and Rajendra N. Chadha, Silver Spring, Md., assignors to W. R. Grace & Co., a corporation of Connecticut
No Drawing. Filed May 21, 1963, Ser. No. 282,149
13 Claims. (Cl. 260—85.5)

This invention relates to a novel and useful polymerization catalyst and a process utilizing said catalyst.

Summarily this invention is directed to polymerizing vinyl monomers by subjecting said monomers to the action of a catalyst consisting essentially of the reaction products of aluminum and mercuric chloride. The term "vinyl monomers" herein means compounds of the formula

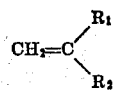

wherein $R_1$ is hydrogen or an organic radical and $R_2$ is an organic radical. The vinyl monomers are well-known in the art and include such material as acrylic acid esters, methacrylic acid esters, vinyl esters, vinyl nitriles, styrene and substituted styrenes. Among the suitable acrylic acid esters which may be employed in the present invention are: methyl acrylate; ethyl acrylate; n-propyl acrylate; isopropyl acrylate; n-butyl acrylate; isobutyl acrylate; sec-butyl acrylate; tert-butyl acrylate; n-pentyl acrylate; n-hexyl acrylate; 2-ethylbutyl acrylate; 2-ethylhexyl acrylate; n-heptyl acrylate; n-octyl acrylate; 3,5,5-trimethylhexyl acrylate; octadecyl acrylate; cyclopentyl acrylate; cyclohexyl acrylate; abitol acrylate (mixed isomers); n-decyl acrylate; tridecyl acrylate; 3,3,5-trimethylcyclohexyl acrylate; 2-n-butoxyethyl acrylate; 2-ethoxyethyl acrylate; 3-ethoxypropyl acrylate; 3-methoxybutyl acrylate; 2-methoxyethyl acrylate; benzyl acrylate; 2-phenoxyethyl acrylate; phenyl acrylate; 2-phenylethyl acrylate; 2-bromoethyl acrylate; 2-chloroethoxyethyl acrylate; 2-chloroethyl acrylate; 2,2,2-trifluoroethyl acrylate; N,N-diethylaminoethyl acrylate; 1,1-dihydroheptafluorobutyl acrylate; N,N-dimethylaminoethyl acrylate; 2-N-morpholinoethyl acrylate and tetrahydrofurfuryl acrylate.

Other suitable vinyl monomers include: abitol methacrylate; acrylonitrile; allyl methacrylate; n-amyl methacrylate; iso-amyl methacrylate; benzyl methacrylate; 2-bromoethyl methacrylate; 2,2-butoxyethyl methacrylate; sec-butyl methacrylate; iso-butyl methacrylate; tert-butyl methacrylate; 2-chloroethyl methacrylate; 2-chlorostyrene; 3-chlorostyrene; 4-chlorostyrene; cinnamyl methacrylate; beta-cyanoethyl methacrylate; cyclohexyl methacrylate; cyclopentyl methacrylate; n-decyl methacrylate; 2,5-dichlorostyrene; N,N-diethylaminoethyl methacrylate; 1,1-dihydroheptafluorobutyl methacrylate; N,N-dimethlaminoethyl methacrylate; 2-ethoxyethyl methacrylate; ethylene dimethacrylate; 2-ethylhexoxyethyl methacrylate; 2-ethylhexyl methacrylate; ethyl methacrylate; furfuryl methacrylate; n-heptyl methacrylate; n-hexyl methacrylate; n-lauryl methacrylate; lauryl methacrylate; 3-methoxybutyl methacrylate; 2-methoxyethyl methacrylate; methyl methacrylate; alpha-methylstyrene; octadecyl methacrylate; iso-propyl methacrylate; styrene; tetraethyleneglycol dimethacrylate; 3,3,5-trimethylcyclohexyl methacrylate; 3,5,5-trimethylhexyl methacrylate; vinyl acetate; vinyl butyrate; vinyl n-decanoate; vinyl 2-ethylhexoate; vinyl laurate; vinyl methacrylate; vinyl n-octanoate; vinyl oleate; vinyl phenylacetate; vinyl propionate and vinyl stearate. The monomers may be used individually or in various combinations to form copolymers or interpolymers. Many others are known in the art and may likewise be used.

The polymerization reaction is operable under atmospheric conditions, i.e. in air but in some cases, notably polymerization of styrenes and substituted styrenes, the reaction is preferably performed in an inert oxygen-free atmosphere to obtain an increased reaction rate. In any event in all cases a slightly higher molecular weight polymer is attained in an inert oxygen-free atmosphere.

The exact nature of the reaction is unknown. As is shown herein, attempts to polymerize vinyl monomers with a catalyst consisting of aluminum per se or mercuric chloride per se yielded no polymer. Thus there is a synergistic effect resulting from the reaction of aluminum and mercuric chloride which causes polymerization to proceed.

The polymerization reaction is performed at temperatures ranging from 20° C. up to the boiling point of the monomer being polymerized.

The catalyst components are operable in an $Al:HgCl_2$ weight ratio range of 0.1 to 10:1 preferably a 1:1 weight ratio is employed.

Since both catalyst components are normally solids, to obtain optimum reaction with the aluminum catalyst component, the $HgCl_2$ is dissolved in a solvent. Various solvents are operable and are well known to one skilled in the art. One class of solvents employed with good results is the ethers, e.g. diethyl ethyl. In some cases, for example when methyl methacrylate is the monomer to be polymerized, the monomer itself acts as a solvent for $HgCl_2$ and no additional solvent is needed. Other vinyl monomers having a solvent action on the $HgCl_2$ can be found empirically by one skilled in the art. The weight ratio of $HgCl_2$ to monomer reactant is generally in the range 1:5 to 100 or more, preferably about 1:25 to 40.

The catalyst components can be premixed prior to addition to the monomer or can be added to the monomer sequentially. No advantage is noted either way nor is there a preferred order of addition of the catalyst components to the monomer.

The following examples will more fully explain but expressly not limit the scope of this invention.

EXAMPLE 1

3 g. of n-butyl acrylate, reagent grade, were washed with dilute NaOH, then with water until neutral. The washed monomer was dried over $Na_2SO_4$ and passed through a silica gel column. The thus purified n-butyl acrylate was charged at 25° C. to an open test tube along with a catalyst consisting essentially of 0.5 g. of minus 30 mesh aluminum metal granules and 0.1 g. $HgCl_2$ dissolved in 2.0 cc. diethyl ether. After about 30 minutes, during which time the reaction temperature increased to about 30–40° C., a slight amount of swelling or growth appeared around the solid catalyst particles. This polymeric growth continued until after about 3 hours it filled the entire volume formerly occupied by the liquid. The solid polymeric growth around the catalyst particles was soft and spongy. A sample of the polymer product was taken after 18 hours of reaction. The polymeric product was not soluble in boiling acetone. Another sample of the product showed that the polymer product dissolves readily in an isopropanol-HCl solution leaving a solid catalyst residue. On addition of a portion of the polymer containing isopropanol-HCl solution to water, a semisolid polybutyl acrylate precipitate of low molecular weight resulted.

EXAMPLE 2

Example 1 was repeated except that the 0.5 g. of aluminum was added in the form of foil strips instead of as granules. After standing for 18 hours at room temperature (25° C.) the liquid converted to a clear soft gel. The gel is separated from the foil mechanically. The gel dissolves readily in hot HCl-isopropanol.

The preceding procedures using both aluminum granules and aluminum foil were repeated except that the reactions were performed in a nitrogen flushed, 250 ml. filter flask under nitrogen. The rates of reaction and the polymer products obtained were about the same.

EXAMPLE 3

Example 1 was repeated except that 3 g. of vinyl acetate were substituted for the 3 g. of n-butyl acrylate. The polyvinyl acetate product obtained was in the form of soft spongy particles which were insoluble in hot acetate but dissolved readily in hot HCl-isopropanol.

EXAMPLE 4

Example 3 was repeated except that the 0.5 g. of aluminum was in the form of foil strips. The polyvinyl acetate product was a gel which was insoluble in hot acetone but readily soluble in hot HCl-isopropanol.

EXAMPLE 5

14 g. of methyl methacrylate were washed with dilute NaOH, and water until neutral, followed by drying over $Na_2SO_4$ and passage through a silica gel column. The thus purified methyl methacrylate was charged to a 250 ml. filter flask followed by the addition of 0.5 g. of aluminum granules (minus 30 mesh) and 0.43 g. $HgCl_2$ dissolved in 10 cc. diethyl ether. The reaction was allowed to stand for 16 hours at room temperature (25° C.) exposed to air. A solid polymer product was obtained around the solid catalyst.

50 cc. methyl ethyl ketone (MEK) was added to the polymer solution and the mixture was heated at reflux for 15 minutes. Most of the product went into solution. The methyl ethyl ketone solution was filtered while hot to remove the catalyst residue and a small amount of in-soluble polymer. After standing at room temperature for one hour, the methyl ketone solution formed a thick gel. This gel did not dissolve upon reheating at reflux for 15 minutes. The mixture was filtered and the gel washed well with MEK. The gel was dried overnight in vacuo at 40° C. The MEK filtrates were added to methanol to precipitate the polymer. The precipitated polymer was filtered, washed with methanol and dried at 40° C. in vacuo overnight. The MEK soluble polymer product weighed 1.4 g. The weight average molecular weight of the MEK soluble polymer product was 42,000.

Table I, following, shows various monomers and catalyst weight ratios operable in the practice of the instant invention. The procedure was the same as that used in Example 5 unless otherwise noted. In examples where copolymers were formed, the respective monomers were both added to the filter flask before the addition of the catalyst components. In the examples wherein the reaction is performed in a nitrogen atmosphere the flask was flushed with dry nitrogen before the reactants were introduced and the reaction was performed in a stoppered flask under a nitrogen blanket. All the examples were run at room temperature (25° C.) and atmospheric pressure unless otherwise noted.

Table I

| Example No. | Monomer or co-monomer (gms.) | Catalyst Aluminum [a] (gms.) | Catalyst $HgCl_2$ [b] (gms.) | Reaction time (hrs.) | MEK insoluble gel fraction (gms.) | MEK soluble fraction (gms.) | Remarks |
|---|---|---|---|---|---|---|---|
| 6 | 3.0 MMA [c] | 5.0 | 0.1 | 16 | | | Hard solid polymethyl methacrylate product. |
| 7 | 14.0 MMA | 0.25 | 0.43 | 16 | [d] 0 | 2.3 | Mn [e] of MEK soluble fraction=25,000. |
| 8 | 14.0 MMA | 0.5 | 0.43 | 16 | [d] 0 | 3.2 | Mn [e] of MEK soluble fraction=27,000. |
| 9 | 14.0 MMA | 1.0 | 0.43 | 16 | [d] 0 | 1.7 | Mn [e] of MEK soluble fraction=27,000. |
| 10 | 14.0 MMA | 1.5 | 0.43 | 16 | [d] 0 | 1.5 | Mn [e] of MEK soluble fraction=32,000. |
| 11 | 14.0 MMA | 2.0 | 0.43 | 16 | [d] 0 | 1.7 | Mn [e] of MEK soluble fraction=32,000. |
| 12 | 14.0 MMA | 2.5 | 0.43 | 16 | [d] 0 | 2.1 | Mn [e] of MEK soluble fraction=38,000. |
| 13 | 14.0 MMA | 0.5 | 0.43 | [f] 16 | 1.5 | 2.0 | Mn [e] of MEK soluble fraction=52,000. |
| 14 | 14.0 MMA | 1.0 | 0.43 | [f] 16 | 1.4 | 0.5 | Mn [e] of MEK soluble fraction=48,000. |
| 15 | 14.0 MMA | 1.5 | 0.43 | [f] 16 | 1.8 | 0 | Mn [e] of MEK soluble fraction=65,000. |
| 16 | 14.0 MMA | 2.0 | 0.43 | [f] 16 | 2.2 | 0.6 | Mn [e] of MEK soluble fraction=46,000. |
| 17 | 14.0 MMA | 2.5 | 0.43 | [f] 16 | 1.8 | 1.1 | Mn [e] of MEK soluble fraction=40,000. |
| 18 | 14.0 MMA | 1.0 | [g] 0.43 | 16 | 1.6 | 1.0 | |
| 19 | 7.0 MMA and 6.8 styrene | 1.0 | 0.43 | 24 | 4.2 | 0.5 | Gel fraction does not fuse at 270° C. MEK soluble fraction softens at 110–130° C. |
| 20 | 7.0 MMA and 6.8 styrene | 1.0 | 0.43 | [f] 24 | 4.2 | 2.0 | Infrared showed band at 1720 cm.$^{-1}$ indicating presence of methyl methacrylate and band at 1610 cm.$^{-1}$ indicating presence of styrene in copolymer. |
| 21 | 40.0 MMA and 38.6 styrene | 3.0 | [g] 1.9 | [f] 84 | 21.7 | 8.9 | |
| 22 | 18.8 MMA and 16.0 acrylonitrile | 0.5 | 0.43 | 168 | | 1.8 | Infrared showed sharp band at 2250 cm.$^{-1}$ indicating presence of acrylonitrile and band at 1720 cm.$^{-1}$ indicating presence of methyl methacrylate in copolymer. |
| 23 | 18.8 MMA | 0.5 | 0 | [f] 240 | 0 | 0 | No polymer product obtained. |
| 24 | 18.8 MMA | 0 | 0.43 | [f] 160 | 0 | 0 | Do. |
| 25 | 13.6 styrene | 1.0 | 0.43 | 48 | | 0.9 | Mn [h] of MEK soluble fraction=65,000. |
| 26 | do | 1.0 | 0.43 | [f] 24 | | 5.5 | Mn [h] of MEK soluble fraction=74,000. |

[a] Aluminum is 30 mesh granules.
[b] 10 cc. diethyl ether used as solvent for $HgCl_2$, unless otherwise specified.
[c] MMA=methyl methacrylate monomer washed with NaOH then water until neutral. The purified MMA was dried over $Na_2SO_4$ and passed through a silica gel column.
[d] Product treated with methanol—HCl so that gel fraction becomes MEK soluble.
[e] Mn=number average molecular weight of polymethacrylate measured in MEK at 25° C. by Method of J. Bischoff and V. Desreux, J. Poly. Sci. 10, 437 (1953).
[f] Reaction performed in nitrogen atmosphere.
[g] No ether. $HgCl_2$ dissolved in MMA.
[h] Mn 2 number average molecular weight of styrene measured in p-chlorotoluene at 25° C. by Method of W. R. Krigbaum, D. K. Carpenter and S. Neuman, J. Phys. Chem., 62, 1586 (1958).

As can be seen from Table I, Examples 23 and 24, no polymerization occurs if both catalyst components are not present.

The present invention is operable in a solution polymerization as well as in bulk polymerizations. For example: in Examples 7–12, the amount of ether added to the reaction flask as a solvent for $HgCl_2$ is sufficient to create a solution polymerization environment.

The polymers obtained by this invention can be used in the same manner as those commercially available. The methyl methacrylate polymer is especially useful where thermal stability is a requisite such as in metal-filled polymers used as heat insulators.

We claim:
1. A polymerization catalyst consisting essentially of aluminum and $HgCl_2$, the weight ratio of $Al:HgCl_2$ being in the range of 0.1 to 10:1 respectively.
2. The composition of claim 1 wherein the $HgCl_2$ is solubilized in an ether.
3. The composition of claim 2 wherein the ether is diethyl ether.
4. The process of polymerizing vinyl monomers of the group consisting of esters of acrylic acid, esters of methacrylic acid, vinyl esters, styrene and substituted styrenes which comprises polymerizing said vinyl monomers in the presence of a catalyst consisting essentially of aluminum and $HgCl_2$ in a weight ratio of 0.1 to 10:1 respectively, the weight ratio of $HgCl_2$ to the vinyl monomer group member being in the range 1:5 to 100 respectively.
5. The process according to claim 4 wherein the ester of methacrylic acid is methyl methacrylate.
6. The process according to claim 4 wherein the $HgCl_2$ is solubilized in an ether.
7. The process according to claim 6 wherein the vinyl ester is vinyl acetate.
8. The process according to claim 6 wherein the ester of acrylic acid is butyl acrylate.
9. The process according to claim 6 wherein the polymerization reaction is performed in an inert oxygen-free atmosphere.
10. The process of copolymerizing methylmethacrylate and styrene which comprises copolymerizing methylmethacrylate and styrene in the presence of a catalsyet consisting essentially of aluminum and $HgCl_2$ in a weight ratio of 0.1 to 10:1 respectively, the weight ratio of $HgCl_2$ to monomer reactants being in the range of 1:5 to 100 respectively.
11. The process according to claim 10 wherein the polymerization reaction is performed in an inert oxygen-free atmosphere.
12. The process of copolymerizing methylmethacrylate and acrylonitrile which comprises copolymerizing methylmethacrylate and acrylonitrile in the presence of a catalyst consisting essentially of aluminum and $HgCl_2$ in a weight ratio of 0.1 to 10:1 respectively, the weight ratio of $HgCl_2$ to the monomer reactants being in the range 1:5 to 100.
13. The process according to claim 12 wherein the polymerization reaction is carried out in an inert oxygen-free atmosphere.

References Cited by the Examiner
UNITED STATES PATENTS

| | | | |
|---|---|---|---|
| 2,686,775 | 8/54 | Howard | 260—88.7 |
| 2,927,105 | 3/60 | Nienburg et al. | 260—94.9 |
| 2,935,542 | 3/60 | Minckler et al. | 260—94.9 |
| 2,969,346 | 1/61 | Coover et al. | 260—93.5 |

JOSEPH L. SCHOFER, *Primary Examiner.*
DONALD E. CZAJA, *Examiner.*